Patented Apr. 25, 1950

2,505,129

UNITED STATES PATENT OFFICE 2,505,129

PROTEIN HYDROLYSIS AND RECOVERY OF GLUTAMIC ACID

Paul D. V. Manning, Glencoe, Ill., assignor to International Minerals & Chemical Corporation, a corporation of New York No Drawing. Application August 27, 1948,
Serial No. 46,559

8 Claims. (Cl. 260—529)

The present invention relates to the production of L-glutamic acid by the hydrolysis of proteinaceous substances. More particularly the invention relates to the production of L-glutamic acid by the hydrolysis of the protein constituents of wheat and corn grains, more commonly known as gluten.

It is the current practice to produce L-glutamic acid, more commonly called "glutamic acid" and hereinafter referred to by this designation, by the hydrolysis of either animal or vegetable proteins. This is conveniently accomplished by subjecting a protein which is a precursor of glutamic acid to hydrolysis in the presence of mineral acids such as dilute sulfuric, phosphoric, hydrochloric, and similar non-oxidizing acids. Conventionally, the protein which is employed for the production of glutamic acid is obtained from cereal grains such as corn and wheat, and such proteins are known to the trade as gluten. Commercial gluten consists of approximately 60 to 85% protein and about 40 to 15% of carbohydrates together with other non-protein material. The gluten is hydrolyzed in order to break down the peptide linkages of the proteins thereby producing glutamic acid as well as numerous other amino acids such as tyrosine, leucine, methionine, lysine, and others. Glutamic acid is recovered from the hydrolysates by conducting a preliminary separation or isolation of carbonaceous-nitrogenous products, commonly known as humin, which are usually formed upon acid hydrolysis of proteins, and subsequently crystallizing from the hydrolysate, substantial amounts of amino acids other than glutamic acid by adjusting the pH of the hydrolysate to such a value that these amino acids will crystallize from the hydrolysate substantially free from glutamic acid. The latter material may then be recovered from the residual solution by reducing the pH of said solution to a value of about 3.2 which is the isoelectric point of glutamic acid. This induces crystallization of glutamic acid from the solution. Such a process usually produces a rather impure grade of glutamic acid and it has been necessary to refine this product in order to produce a glutamic acid which has a sufficient purity so as to be useful in the pharmaceutical and food industries. This purification may be accomplished by dissolving the crude product in an aqueous solution containing slightly less than one equivalent weight of sodium hydroxide or similar alkaline material. The glutamic acid forms a solution of alkaline metal glutamate which may be decolorized by conventional methods, for example, by treatment with activated carbon or charcoal. The resultant solution will produce a substantially pure alkali glutamate or in the alternative it may be adjusted to a pH value of about 3.2 by the addition of suitable acidic material thereby inducing crystallization of substantially pure glutamic acid.

Wheat gluten ordinarily contains about 70-85% by weight of proteinaceous substances which in turn contain about 35% by weight of potential glutamic acid. Corn gluten contains about 60 to 75% by weight of protein, the latter containing about 26% by weight of potential glutamic acid. The most efficient methods for the hydrolysis of such proteins as heretofore employed, followed by recovery of glutamic acid from the hydrolysates, have produced a glutamic acid extraction of about 85% of the theoretical in the case of wheat gluten and about 60% of the theoretical in the case of corn gluten. The remainder of the glutamic acid has been lost either during the hydrolysis procedure or in subsequent steps employed for the recovery of glutamic acid from the hydrolysates. It is therefore obvious that an improved hydrolytic process is desirable for the production of glutamic acid from such proteinaceous substances.

It is an object of the invention to provide an improved process for achieving an increased yield of glutamic acid from the hydrolysis of corn and wheat protein.

It is a further object of the invention to provide an improved process for the production of glutamic acid from corn protein whereby the yield of glutamic acid therefrom is substantially increased in comparison with processes which have been heretofore employed.

It is a further object of the invention to provide an improved process for the production of glutamic acid from corn protein, said protein being present in a mixture with wheat protein.

It is a further object of the invention to produce an improved process for the production of glutamic acid by the hydrolysis of proteinaceous substances containing wheat and corn protein.

The above objects, as well as others which will become apparent upon a more complete understanding of the invention which is hereinafter fully described are accomplished by subjecting a composition comprising a major amount of wheat gluten and a minor amount of corn gluten to acid hydrolysis under substantially non-oxidizing conditions and recovering glutamic acid from the resulting hydrolysate. It has now been found that by hydrolyzing a proteinaceous composition containing specific and controlled ratios of wheat gluten to corn gluten it is possible to increase the extraction of glutamic acid from about 60% to about 80 to 82% of the theoretical amount of glutamic acid potentially available in corn gluten while maintaining the high extraction of glutamic acid from wheat gluten. This results in an increase of about 33% by weight in the yield of glutamic acid normally produced by the hydrolysis of corn gluten by conventional procedures.

In general, the present invention is carried out by hydrolyzing a proteinaceous composition which contains corn gluten and wheat gluten in certain specified ratios, preferably a ratio of one part by weight of corn gluten to greater than one part by weight of wheat gluten. The amount of wheat gluten is always maintained in excess in relation to corn gluten, and the increased yield of glutamic acid obtained by hydrolyzing mixtures of wheat gluten and corn gluten is not realized unless the ratios of wheat gluten to corn gluten are maintained as herein described. When conducting an hydrolysis of a proteinaceous composition consisting of wheat gluten and corn gluten substantially in the absence of other protein materials, said composition should contain between about one and about 90% by weight of corn gluten based upon the weight of the wheat gluten content of said composition.

While it may be convenient to produce glutamic acid by the hydrolysis of a mixture of wheat gluten and corn gluten present in the previous described ratios, the invention is not restricted to the hydrolysis of this particular type of proteinaceous composition. Alternatively any proteinaceous substance, either animal or vegetable in nature, may be present during the hydrolysis, having been added to the corn gluten-wheat gluten mixture either prior to or during hydrolysis. For example, such vegetable proteins as soybean protein, peanut protein, zein, cottonseed protein, and similar vegetable protein substances may be present in the mixture with the wheat gluten and corn gluten. Animal protein such as meat fiber, casein, blood meal, as well as similar products may also be present during a hydrolysis of wheat gluten and corn gluten in the event that hydrolysates containing particular amino acids are desired. Again, animal and vegetable protein may both be present, together with wheat gluten and corn gluten, should any particular type of hydrolysate be desired. In all events, it has been found that when a ratio of wheat gluten and corn gluten is maintained in accordance with the previous described figures, an increased amount of glutamic acid is realized as compared with the separate hydrolysis of wheat gluten and corn gluten.

It will be obvious to those skilled in the art that the hydrolysis of corn gluten-wheat gluten mixtures, which may or may not contain any of the other protein substances mentioned above, should be conducted under non-oxidizing conditions in order to prevent degradation or oxidation of the amino acids which are produced by hydrolysis of proteins. While it is usual to employ, in most instances, any of the inorganic acids such as sulfuric, hydrochloric, and phosphoric acids, the conditions of hydrolysis are regulated by appropriate dilution of any of these acids or mixtures thereof and appropriately regulating the temperature during hydrolysis as well as controlling the duration of the hydrolysis in order to eliminate, insofar as is possible, the aforementioned undesirable features.

More particularly the instant novel process involves the acid hydrolysis of proteinaceous compositions which contain corn gluten and wheat gluten, the latter being present in such amounts that wheat gluten is consistently in excess of the amount of corn gluten. It has been found that a particularly advantageous ratio of wheat gluten to corn gluten is about 4 to about 1, parts by weight. In this case it is possible to increase the yield of glutamic acid ascribed to corn gluten about 33% over and above the total amount of glutamic acid which has been realized by hydrolyzing the same amounts of corn gluten alone. The ratio of wheat gluten to corn gluten may be reduced to about 55 to 45, parts by weight, but the advantageous features of the invention are not realized when corn gluten is present in excess of wheat gluten, or when the two are present in approximately equal amounts. In these latter instances, the amount of glutamic acid which is produced by hydrolyzing such wheat gluten-corn gluten mixtures does not exceed the amount normally obtained by conducting separate hydrolysis procedures on corn and wheat glutens.

The hydrolysis of corn gluten-wheat gluten mixtures present in a ratio as previously described may be conducted with any one or more of the acidic materials mentioned above. Conveniently, an aqueous hydrochloric acid solution containing between about 10 and about 37% HCl or a dilute sulfuric acid containing between about 10 and about 50% $H_2SO_4$, by weight, may be mixed with the proteinaceous composition which contains corn gluten and wheat gluten, these being present preferably in a ratio of about 4 parts by weight of wheat gluten to about 1 part by weight of corn gluten. Hydrolysis is accomplished by heating the mixture at a temperature between about 80° and about 150° C. for an appropriate period of time, the duration of which will depend upon the extent or rate of hydrolysis of the proteinaceous substances. Usually a period of between about ½ and about 18 hours will suffice. The resulting acidic hydrolysate will contain substantial quantities of insoluble and colloidal impurities which have been commonly designated as humin. These impurities may be removed from the hydrolysate by conventional filtration procedures, preferably in the presence of mineral diatomaceous filter aids, thereby producing a solution which is subtantially free of said impurities. The resulting solution contains glutamic acid as well as other amino acids of the type hereinbefore described. In order to effect a separation of glutamic acid from such hydrolysates it is preferable to adjust the pH of the hydrolysate, by means of a suitable alkaline reagent, to between about 5.0 and about 7.0 and allow the adjusted hydrolysate to stand for an appropriate period of time in order to induce crystallization of inorganic salts and amino acids other than glutamic acid, for example tyrosine and leucine. In some instances it is preferable to employ an evaporation step prior to the pH adjustment of the hydrolysate or subsequent thereto in order to produce a higher yield of amino acids other than glutamic acid. The other amino acids are removed by filtration or other conventional procedures, for example by means of a basket type centrifuge. Alternatively, the humin impurities may be removed from the hydrolysate together with the amino acids other than glutamic acid by simply adjusting the pH of the hydrolysate to between about 5.0 and about 7.0 and separating the humin together with the other amino acids which have crystallized from the solution to an appropriate concentration of said amino acids.

The pH adjustments of the acidic hydrolysates may be accomplished by adding thereto any suitable alkaline material which may be either inorganic or organic in nature. For example, inorganic materials such as ammonia, sodium hydroxide, potassium hydroxide, sodium and potassium carbonates and bicarbonates are useful. Quicklime, slaked lime, and calcium carbonate may be appropriately employed depending upon whether or not the precipitation of inorganic salts together with amino acids other than glutamic acid at a pH between about 5.0 and about 7.0 is desirable. The filtrate which results from the removal of amino acids other than glutamic acid in accordance with the methods just described may be acidified to adjust its pH to about 3.2 in order to induce crystallization of glutamic acid. This pH adjustment may be accomplished by the use of either inorganic or organic acidic substances, for example mineral acids such as hydrochloric, sulfuric and phosphoric acids, or organic acids such as formic and acetic acids. Since it is the usual practice to conduct an evaporation step followed by a filtration of insoluble products at a pH between about 5.0 and about 7.0, it is desirable to avoid the addition of substantial quantities of water to the glutamic acid-containing solution as in such event the yield of glutamic acid obtained in subsequent crystallization procedures will be impaired. It is therefore preferable to employ concentrated acids, for example anhydrous or concentrated HCl, for the adjustment of the final filtrate to a pH of about 3.2. The adjusted solution is allowed to stand for a period of about one to five days in order to permit the crystallization of glutamic acid. This product is isolated from the residual solution by conventional filtration procedures, for example by employing a basket-type centrifuge. In order that this product may be directed to the pharmaceutical and food industries, it is usually necessary to further refine it by dissolving it in a solution containing slightly less than one equivalent weight of alkaline material, such as caustic soda, and decolorizing the resultant solution with appropriate amounts of decolorizing agents such as activated carbon or charcoal.

In certain instances it is advantageous to conduct the hydrolysis of mixtures of corn gluten and wheat gluten, present in the previously described ratios, or protein compositions containing corn gluten and wheat gluten in such prescribed amounts, by employing sulfuric acid hydrolysis. More particularly, a mixture of corn gluten and wheat gluten present in a ratio of about one part by weight of corn gluten to greater than one part by weight of wheat gluten may be hydrolyzed with aqueous sulfuric acid containing between about 10 and about 50% $H_2SO_4$ by weight. The hydrolysis may be conducted at a temperature of about 100° C. for a period of time between about one and about 18 hours to complete the hydrolysis of the various proteins. The hydrolysate is cooled slightly and the pH thereof is adjusted to between about 10 and about 11.5 by the addition of reagent selected from the group consisting of alkaline earth metal oxides, hydroxides, carbonates, and bicarbonates. Specific reagents such as calcium oxide or hydroxide or barium carbonate or bicarbonate, barium oxide or hydroxide or barium carbonate or mixtures thereof are particularly suitable for this pH adjustment. A filtration is then conducted whereby alkaline earth metal sulfate is removed from the hydrolysate together with the insoluble humin which is formed during hydrolysis. It has been found that the removal of humin within this pH range is particularly efficient. The pH of the resultant solution is adjusted to between about 7.0 and about 8.5 by adding reagent thereto which will form an anion which will produce an alkaline earth metal salt substantially insoluble in the hydrolysate. For this purpose reagents such as $SO_2$, $CO_2$, and sodium or potassium carbonate, bicarbonate, sulfite or bisulfite are particularly useful. This results in the precipitation of alkaline earth metal sulfites or carbonates, depending upon the particular reagent employed in the pH adjustment. The inorganic salts thus formed may be removed by conventional filtration procedures, either as such or together with amino acids other than glutamic acid. Thereafter the resulting filtrate is evaporated until the aqueous phase has a specific gravity of between about 1.2 and about 1.4. This solution is permitted to stand at room temperature in order to induce crystallization of amino acids other than glutamic acid as well as additional precipitation of inorganic salts. These products are removed from the solution by filtration, and the resulting glutamic acid-containing solution is adjusted with a suitable acidic material, for example hydrochloric acid, to give a pH of about 3.2. Upon permitting this solution to stand at room temperature glutamic acid will crystallize therefrom and may be isolated by conventional filtration procedures. In the event that the crude product must be further purified, this may be accomplished by methods previously herein described.

In order to further illustrate the nature and character of the invention, but with no intention of being limited thereby, the following examples are recited:

Example I

This process illustrates the hydrolysis of wheat protein or gluten which contains about 77% by weight of protein, the remainder being substantially a mixture of carbohydrates.

About 200 grams of wheat gluten was added slowly to about 400 grams of aqueous hydrochloric acid (26% HCl) while slowly raising the temperature of the acid to about 80° C. The resultant mixture was then heated in an autoclave or similar pressure apparatus at a temperature between about 120° and about 130° C. for about 2½ hours. The resultant hydrolysate was cooled to about 30° C. and its pH was adjusted with aqueous sodium hydroxide solution to between about 5.5 and about 7.0. Ordinarily about 230 grams of 50% sodium hydroxide solution will suffice for this particular operation. The temperature of the hydrolysate was not permitted to exceed about 85° C. during this neutralization step. The neutralized hydrolysate was cooled to between about 50° and about 60° C. and was then filtered in order to remove insoluble humin substances. The filter cake was washed with small quantities of warm water and the washings combined with the original filtrate. The resulting solution was evaporated in a vacuum to a weight of between about 515 and about 525 grams and was then permitted to stand at room temperature in order to induce crystallization of inorganic salts and amino acids other than glutamic acid. These were removed from the solution by filtration and the pH of the filtrate was adjusted to about 3.2 with concentrated hydrochloric acid. Upon standing for a period of between about 1 and about 5 days, glutamic acid crystallized from this solution and was isolated by filtration. The purity of the glutamic acid thus obtained averages about 92 to 94%, and the yield is about 46.0 grams, or 86% based on the theoretical amount of glutamic acid potentially available in wheat protein.

*Example II*

Corn gluten or protein containing about 73% by weight of protein was hydrolyzed in accordance with the procedure outlined in Example I. The final glutamic acid product isolated from the hydrolysate has a purity of 87 to 94%, and the average extraction or yield of glutamic acid averages about 22.5 grams or 59% of the theoretical, based upon the amount of glutamic acid potentially available in corn gluten.

*Example III*

The mixture of 80 parts by weight of wheat gluten of the type employed in Example I, and about 20 parts of corn gluten, such as employed in Example II (a ratio of about 4 to about 1, parts by weight), was hydrolyzed in accordance with the procedure outlined in Example I, and glutamic acid was also isolated from the hydrolysate in accordance with the procedure outlined in Example I. The yield or extraction of glutamic acid by employing such a procedure averages about 43.2 grams. Assuming the predetermined glutamic acid extraction value of 86.1% (Example I) for wheat gluten, the extraction from corn gluten is calculated to be 80.8% of theoretical. This is in contrast to the yield of 59% of glutamic acid obtained by hydrolyzing corn gluten, as illustrated in Example II.

*Example IV*

A wheat gluten-corn gluten mixture containing a ratio of about 65 parts by weight of wheat gluten to about 35 parts by weight of corn gluten was hydrolyzed in accordance with the procedure outlined in Example I. The amount of glutamic acid produced by processing this mixture of wheat gluten and corn gluten results in a yield of 39.5 grams of product on a pure dry basis. Assuming that the yield of glutamic acid produced solely from wheat gluten remains constant at about 86% (Example I), the extraction attributed to the corn gluten fraction is about 70%. Since the hydrolysis of corn gluten alone produces an average extraction of glutamic acid of about 59% (Example II), the increased yield of glutamic acid produced by hydrolyzing a mixture of corn gluten and wheat gluten immediately becomes apparent.

While the above examples illustrate the hydrolysis of corn gluten and wheat gluten present in specified ratios, the scope of the invention is not limited thereto. On the contrary, various ratios of corn gluten and wheat gluten may be employed as hereinbefore described, nor is it essential that other proteinaceous substances be absent during the hydrolysis. As previously mentioned herein, it is contemplated that in the proteinaceous compositions which may be hydrolyzed with acid to produce glutamic acid, protein materials other than corn gluten and wheat gluten may be present, in addition to these proteins, and may be either animal or vegetable in nature.

It is not intended that the invention be limited to the procedural details set forth in the above examples or in the more particular description of the invention as herein set forth. On the contrary, numerous extensions and modifications of the hydrolytic, neutralization and evaporation procedures as well as of methods for the isolation of glutamic acid, amino acids other than glutamic acid and inorganic salts, may be employed without departing from the scope and spirit of the invention.

The expression "glutamic acid" and similar expressions when used in this specification and accompanying claims is intended to refer to the naturally occurring optical isomer of glutamic acid and related compounds, and more recently designated in the literature as L-glutamic acid.

Having thus fully described the nature and character of the invention, what is desired to be secured by Letters Patent is:

1. A process for producing glutamic acid which comprises hydrolyzing a proteinaceous composition comprising about 80% by weight of wheat gluten and about 20% by weight of corn gluten with mineral acid which is non-oxidizing under the conditions obtaining, and recovering glutamic acid from the hydrolysate.

2. A process as in claim 1 wherein the mineral acid employed is aqueous hydrochloric acid.

3. A process as in claim 1, wherein the mineral acid employed is dilute aqueous sulphuric acid.

4. A process for producing glutamic acid, which comprises hydrolyzing a composition consisting of a ratio of about four parts by weight of wheat gluten to about one part by weight of corn gluten with aqueous hydrochloric acid at a temperature between about 80° and about 130° C., adjusting the pH of the hydrolysate to between about 6.0 and about 7.0 by adding caustic soda thereto, separating insoluble matter from the resultant mixture, concentrating the resultant liquor to the point of incipient crystallization of salts, cooling the resultant liquor, separating the precipitated salts therefrom, adjusting the pH of the resultant solution to about 3.2 with hydrochloric acid, and recovering crystallized glutamic acid therefrom.

5. A process for producing glutamic acid, which comprises hydrolyzing a composition comprising a mixture of corn gluten and wheat gluten present in a ratio of about one part by weight of wheat gluten and corn gluten in a ratio varying between about 80% by weight of wheat gluten and about 20% by weight of corn gluten and about 55% by weight of wheat gluten and about 45% by weight of corn gluten with aqueous sulfuric acid containing between about 10 and about 50% $H_2SO_4$ by weight, adjusting the pH of the hydrolysate to between about 10 and about 11.5 by adding thereto reagent selected from the group consisting of alkaline earth metal oxides, hydroxides, carbonates and bicarbonates, separating precipitated solids from the aqueous phase, adjusting the pH of the resultant solution to between about 5.5 and about 8.5 by adding thereto reagent which will form an anion which will produce an alkaline earth metal salt substantially insoluble in the hydrolysate, evaporating the resultant mixture until the aqueous phase has a specific gravity between about 1.2 and about 1.4, crystallizing and removing therefrom precipitated salts and amino acids other than glutamic acid, adjusting the pH of the resultant solution to about 3.2 with hydrochloric acid, and recovering crystallized glutamic acid therefrom.

6. A process for producing glutamic acid which comprises hydrolyzing a proteinaceous composition containing wheat gluten and corn gluten in a ratio varying between about 80% by weight of wheat gluten and about 20% by weight of corn gluten, and about 55% by weight of wheat gluten and about 45% by weight of corn gluten, with a mineral acid which is non-oxidizing under the conditions obtaining, and recovering glutamic acid from the hydrolysate.

7. A process as in claim 6, wherein the mineral acid employed is aqueous hydrochloric acid.

8. A process as in claim 6, wherein the mineral acid employed is dilute aqueous sulfuric acid.

PAUL D. V. MANNING.

REFERENCES CITED

The following references are of record in the file of this patent:

UNITED STATES PATENTS

| Number | Name | Date |
|---|---|---|
| 2,194,302 | Gerber | Mar. 19, 1940 |
| 2,214,115 | Bishop et al. | Sept. 10, 1940 |
| 2,347,220 | Shildneck | Apr. 25, 1944 |
| 2,380,890 | Waters | July 31, 1945 |

OTHER REFERENCES

Tseng et al.: J. Chinese Chem. Soc., vol 3, pp. 157–166 (1935).